United States Patent

Karlecik-Maier

[11] Patent Number: 5,627,734
[45] Date of Patent: May 6, 1997

[54] METHOD AND CONTROL ARRANGEMENT FOR DC TRANSMISSION, AND A CONTROL DEVICE

[75] Inventor: Franz Karlecik-Maier, Höchstadt, Germany

[73] Assignee: Siemens Aktiengesellschaft, Munich, Germany

[21] Appl. No.: 525,568

[22] PCT Filed: Mar. 2, 1994

[86] PCT No.: PCT/DE94/00227

§ 371 Date: Sep. 18, 1995

§ 102(e) Date: Sep. 18, 1995

[87] PCT Pub. No.: WO94/22211

PCT Pub. Date: Sep. 29, 1994

[30] Foreign Application Priority Data

Mar. 16, 1993 [DE] Germany .................. 43 08 362.5

[51] Int. Cl.$^6$ ........................................... H02J 3/36
[52] U.S. Cl. ........................................... 363/35; 363/51
[58] Field of Search ........................... 363/35, 37, 51

[56] References Cited

U.S. PATENT DOCUMENTS

| | | |
|---|---|---|
| 4,210,956 | 7/1980 | Watanabe ............................ 363/51 |
| 4,494,179 | 1/1985 | Inokuchi et al. ..................... 363/35 |
| 4,563,732 | 1/1986 | Ljungqvist et al. .................. 363/35 |
| 4,598,350 | 7/1986 | Sakai et al. ......................... 363/35 |
| 4,649,466 | 3/1987 | Rogowsky ........................... 363/35 |
| 5,220,493 | 6/1993 | Knittler .............................. 363/35 |

FOREIGN PATENT DOCUMENTS

| | | |
|---|---|---|
| 0087640 | 9/1993 | European Pat. Off. . |
| WO91/01061 | 1/1991 | WIPO . |
| WO92/22118 | 12/1992 | WIPO . |

*Primary Examiner*—Peter S. Wong
*Assistant Examiner*—Y. J. Han
*Attorney, Agent, or Firm*—Kenyon & Kenyon

[57] ABSTRACT

To provide for an improved operating characteristic of a direct-current transmission between static converters (5a, 5b) of a high-voltage direct-current transmission installation, a method and an arrangement (1a) are provided in which the static converters (5a, 5b) are in each case supplied with control signals (αa, αb) which are assembled from part-control signals (αi to αn). The closed-loop control devices (11a, 11b) preceding the static converters (5a, 5b) are constructed as vector controllers in this arrangement.

18 Claims, 4 Drawing Sheets

METHOD AND CONTROL ARRANGEMENT FOR DC TRANSMISSION, AND A CONTROL DEVICE

BACKGROUND OF THE INVENTION

The invention relates to a method for the transmission of direct current between two static converters. It is also related to a closed-loop control arrangement for the transmission of direct current between two alternating-current systems.

In certain cases, direct-current transmission is used for transmitting electrical power between two alternating-voltage systems. In this arrangement, a rectifier is connected to the first alternating-voltage system, which rectifier generates a direct current which, in turn, is supplied to an inverter. The inverter is connected to the second alternating-voltage system. In this manner, the two alternating-voltage systems are coupled to one another via a direct-current connection. The direction of energy flow can be reversible in this arrangement. Such an arrangement involving direct-current transmission between two static converters is known, for example, from WO 92/22 118.

To operate such arrangements, different closed-loop control methods are used. An example of these is the so-called marginal-current method. In this method, rectifier and inverter in each case exhibit a current controller, the characteristics of which are offset from one another by a marginal current. It is also usual in this arrangement that both static converters exhibit a voltage controller. In this manner, an exactly defined operating characteristic which exhibits a current and a voltage branch is allocated to each static converter. The intersection between the respective operating characteristics then produces the operating point of the overall arrangement in operation. Depending on the instantaneous operating situation, only one controller, namely that for current or voltage is always active, if necessary via a minimum- or maximum-demand selection, in such an arrangement. The other controllers are not involved. When disturbances occur, for example due to harmonic superimpositions on the direct current, the instantaneous operating point can approach the nominal operating point or depart from it in accordance with the harmonic oscillations.

EP-A-0,087,40 discloses a method and a closed-loop control arrangement for the transmission of direct current between two static converters, the controller devices of the static converters in each case being supplied with a control signal. The static converters exhibit a common operating point. In order to form the respectively active control signals, in this case a selection is made via a respective maximum selection between two available control signals. In this process, one or the other control signal respectively comes into play. This method also operates according to the marginal-current principle.

SUMMARY OF THE INVENTION

The invention is based on the object of specifying a method and a closed-loop control arrangement by means of which the control characteristic in the transmission of direct current between two static converters which are in each case connected to an alternating-voltage system is improved compared with the prior art.

The novel method can be called multi-dimensional vector control which exhibits an arbitrary number of degrees of freedom, the controllers (deviations) used for this purpose being activated in such a manner that—although they are operating autonomously—they benefit the overall characteristic of the direct current transmission. In this connection, a large variety of special conditions and strategies can be taken into consideration in the operation of the direct-current transmission, for example for fault cases. The novel controller structure is suitable, in particular, for digital closed-loop control arrangements which are implemented by means of a computer and a program. However, an analog embodiment is also easily possible. The invention is also suitable for multi-point operation involving more than two static converters. A preferred embodiment is constructed to be three-dimensional.

In this manner, a completely novel controller structure can be provided for the operation of the direct-current transmission. A departure was made from the conventional hierarchically ordered controller structure, particularly for the inverter, and a completely novel controller structure was designed which allows any deviations to be influenced. The configuration of the novel controller structure is astonishingly simple and allows multi-dimensional closed-loop control.

BRIEF DESCRIPTION OF THE DRAWINGS

In the text which follows, the invention and further advantages will be explained in greater detail by way of the example of variants of the embodiment and the drawings.

DETAILED DESCRIPTION

Figure 1:
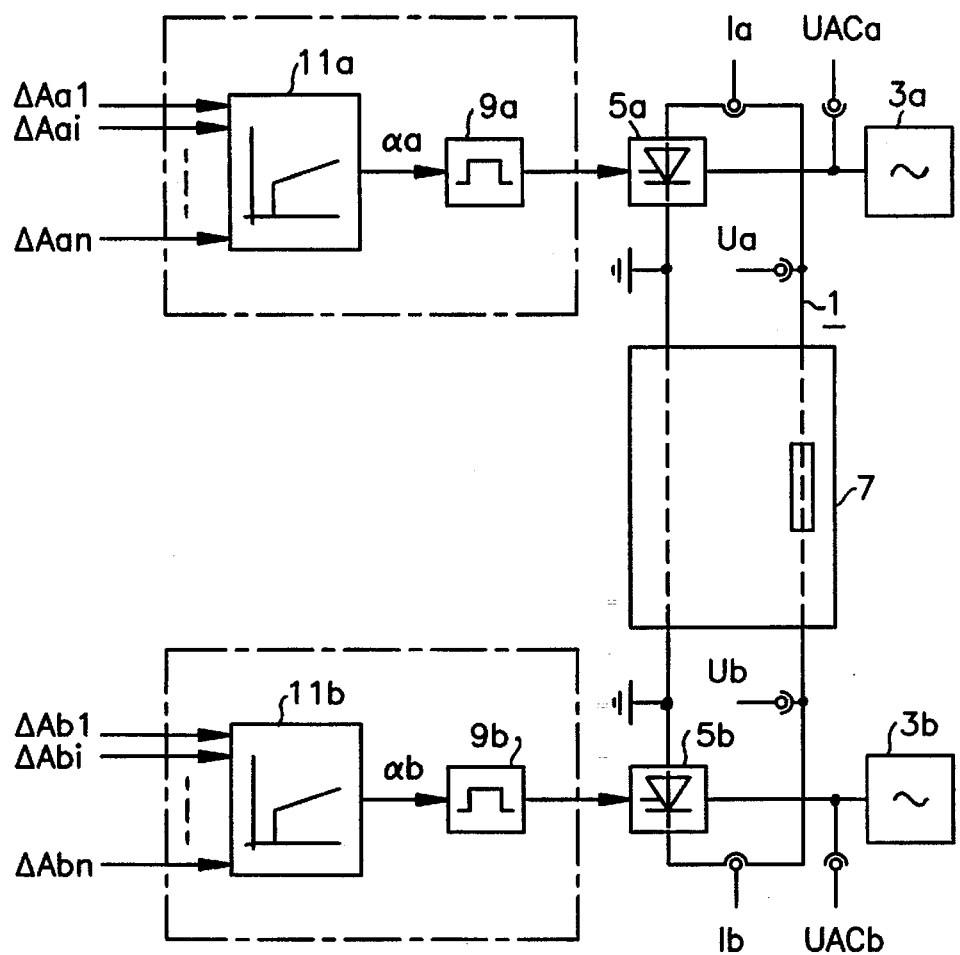
FIG. 1 shows an arrangement for transmitting direct current.

FIG. 1 shows a basic arrangement 1, particularly a high-voltage direct-current transmission installation for the transmission of direct current, in which a first and a second three-phase system 3a and 3b, respectively, are electrically connected to one another. To this end, the arrangement 1 exhibits two static converters 5a, 5b which are connected to one another at the direct-current end via a direct-current line 7 or direct-current connection which, if necessary, is grounded. At the three-phase end, the two static converters 5a, 5b are in each case connected to one of the three-phase systems 3a and 3b, respectively. Depending on the construction of the direct-current line 7, the entire arrangement 1 can be constructed, for example, as back-to-back link or also as long-distance transmission. In particular, this relates to the application in high-voltage direct-current transmission installations (HVDCT), which are used for coupling power systems. In the following embodiments, it will be assumed that an energy transport takes place from three-phase system 3a to three-phase system 3b. In this arrangement, one static converter 5a is constructed and operated as rectifier and the other static converter 5b is constructed and operated as inverter. Naturally, an energy reversal is also possible. Thus, the following embodiments can be appropriately applied to the reverse direction of energy flow. The procedure is explained by means of the rectifier branch as example. At predetermined locations, the arrangement 1 exhibits sensors, not designated in greater detail, for sensing the currents Ia and Ib, the voltage UACa, UAcb, Ua and Ub.

Each static converter 5a, 5b is associated with a control device 9a and 9b, respectively, which is supplied with an associated control signal, namely a signal for the control angle αa and αb, respectively, from a closed-loop control device 11a and 11b, respectively. The control angles αa, αb describe the firing angles.

Starting with this configuration, it is essential for the operation of the arrangement 1 that the two static converters 5a, 5b are adjusted to one another in steady-state operation, for example with a predetermined power P to be transmitted, in order to provide for and operation that is as lossless as possible while, at the same time remaining stable. For this purpose, they are set to a common operating point A which is shown as I/U diagram in two-dimensional representation in FIG. 4. Starting with the power P to be transmitted, this operating point A describes the current IA and the voltage UA at the operating point A for the direct-current connection. As a rule, the power P to be transmitted is a value which is predetermined and changed, if at all, at large time intervals. In practice, this value is forwarded from one converter station to another, for example by telephone message transmission. The power P therefore represents the steady-state operating power, as it were.

In the present case, this common operating point A is then considered to be a multi-dimensional quantity, having, in this case, the prescribed current as one of its dimensions and the prescribed voltage as another. The dimensions of this common operating point A are predetermined and, of course, need not be limited to the current and voltage. The common operating point A should be reached in interaction by the two static converters 5a and 5b. For this purpose, the two closed-loop control devices 11a and 11b are supplied with part-deviations $\Delta Aai$ to $\Delta Aan$, respectively, each of wich represents the deviation between a dimension of the common operating point A and the corresponding dimension of the current operating point Aist of the respective static converter. This vectorial notation has the result that the respective static converter reaches the operating point A directly if possible and as quickly as possible. Although each static converter station by itself autonomously heads towards the operating point A, this occurs with the overall aim of jointly reaching the operating point A. The approach therefore occurs simultaneously, both converter stations always making a contribution. At least one control action always takes place simultaneously at two static converters compared with only one in the prior art.

Figure 4:
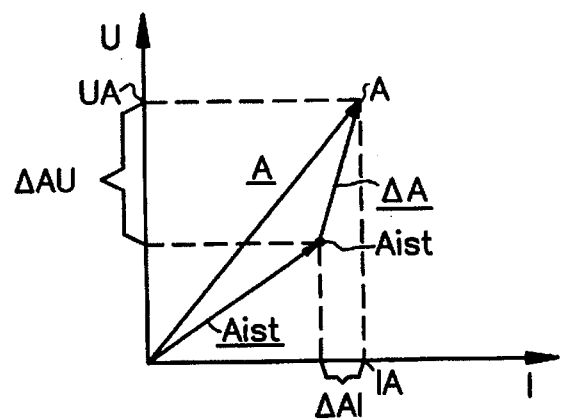
FIG. 4 shows a diagram relating to the operating point of the arrangement.

This type of operation is explained in greater detail in FIG. 4. In this figure, a predetermined operating point A which has to be reached is shown in the current/voltage diagram I/U. The current operating point is designated by Aist. These two operating points A, Aist will now be considered as vectorial quantities $\underline{A}$ and $\underline{Aist}$. The result of the difference of these two vectors is the deviation vector $\underline{\Delta A}$. The projection of this vector generates the deviations $\underline{\Delta AI}$ and $\underline{\Delta AU}$ which correspond to the deviations of a current or voltage controller in the conventional technology. To reach the operating point A (by correcting the static converter control signals), it is required that the amount of the deviation $\Delta A$ is controlled to zero, i.e. $\Delta AU$ and $\Delta AI$ must be zero at the same time. The result is that this control task can be optionally carried out with one or two controllers.

Generalized, the equation $$\Delta A = \Delta i + \Delta u + \ldots + \Delta n$$

is used as a basis in the present closed-loop control method. $\Delta i$, $\Delta u$ to $\Delta n$ here mean the respective deviations of a controlled variable or dimension, the index specifying the reference to the respective controlled variable. For a multi-dimensional controller, this provides the formulation $$\alpha = \alpha i + \alpha u + \ldots + \alpha n$$

where $\alpha$ is the control angle which is composed of the part-control angles $\alpha i$ to $\alpha n$. These can be supplied by part-controllers (fictitious part-controllers). Assuming that the part-controllers are PI controllers, this results in:

$$\alpha = \left( KPi + \frac{1}{sTIi} \right) \cdot di +$$

$$\left( KPu + \frac{1}{sTIi} \right) \cdot du + \ldots + \left( KPn + \frac{1}{sTIi} \right)$$

where $$\alpha = \left( KPi + \frac{1}{sTIi} \right) \cdot di$$

is the part-control angle of a current controller, $$\alpha = \left( KPu + \frac{1}{sTIu} \right) \cdot du$$

is the part-control angle of a voltage controller, and $$\alpha = \left( KPn + \frac{1}{sTIn} \right) \cdot dn$$

the part-control angle of the nth controlled variable.

Sorted in accordance with P and I components, this can be written as:

$$\alpha = KPi \cdot di + KPu + \ldots + KPn \cdot +$$

$$\frac{1}{sTI} \cdot \left[ \frac{TI}{TIi} \cdot di + \frac{TI}{TIu} \cdot du + \ldots + \frac{TI}{TIn} \cdot \right]$$

or $$\alpha = KPi \cdot di + KPu \cdot du + \ldots + KPn \cdot dn +$$

$$\frac{1}{sTI} \cdot [Ti \cdot di + TU \cdot du + \ldots + Tn \cdot dn]$$

Where;

$$Ti = \frac{TI}{TIi}, Tu = \frac{TI}{TIu} \text{ and } Tn = \frac{TI}{TIn}$$

Figure 2:
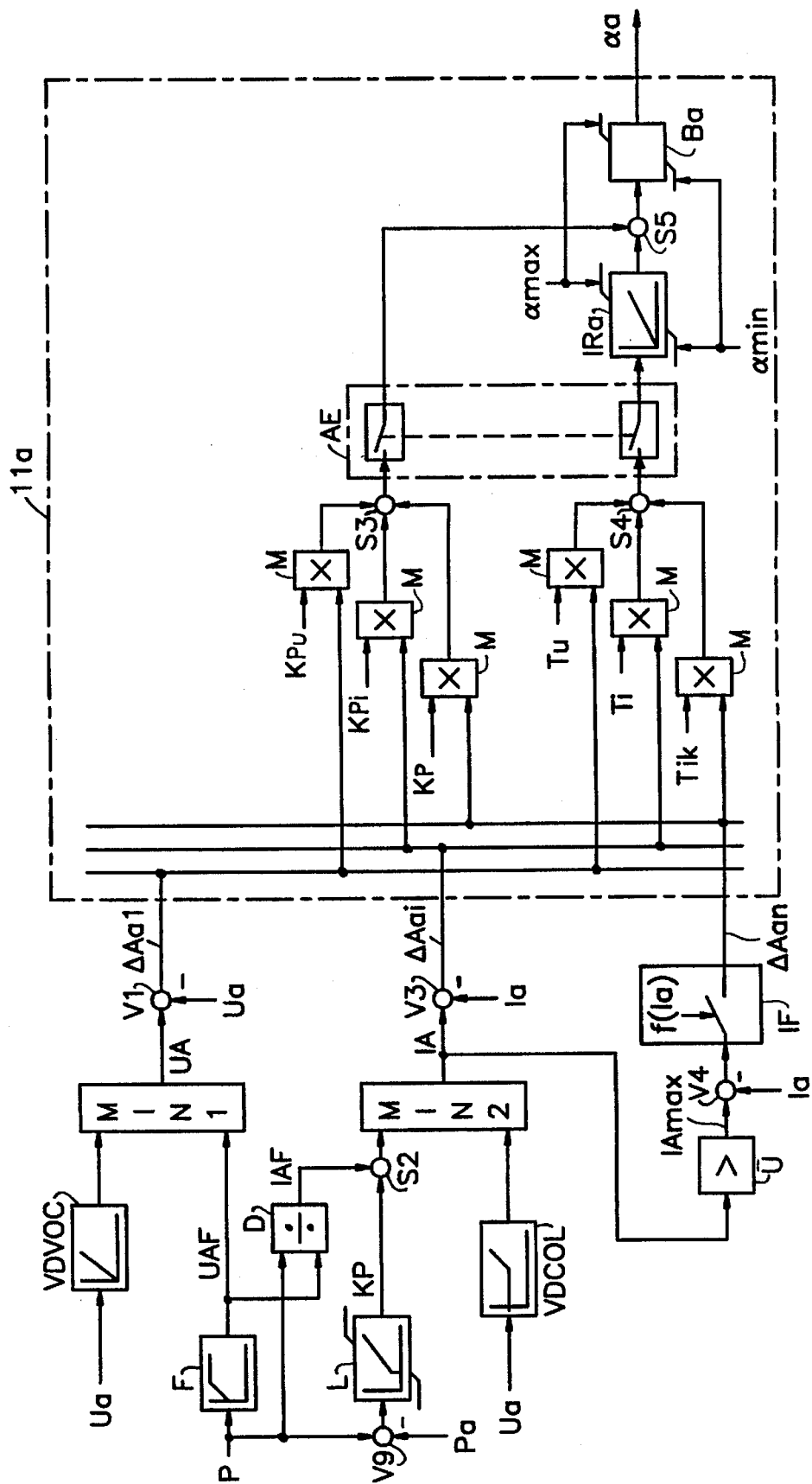
FIG. 2 shows a first controller structure which is intended for a rectifier.
Figure 3:
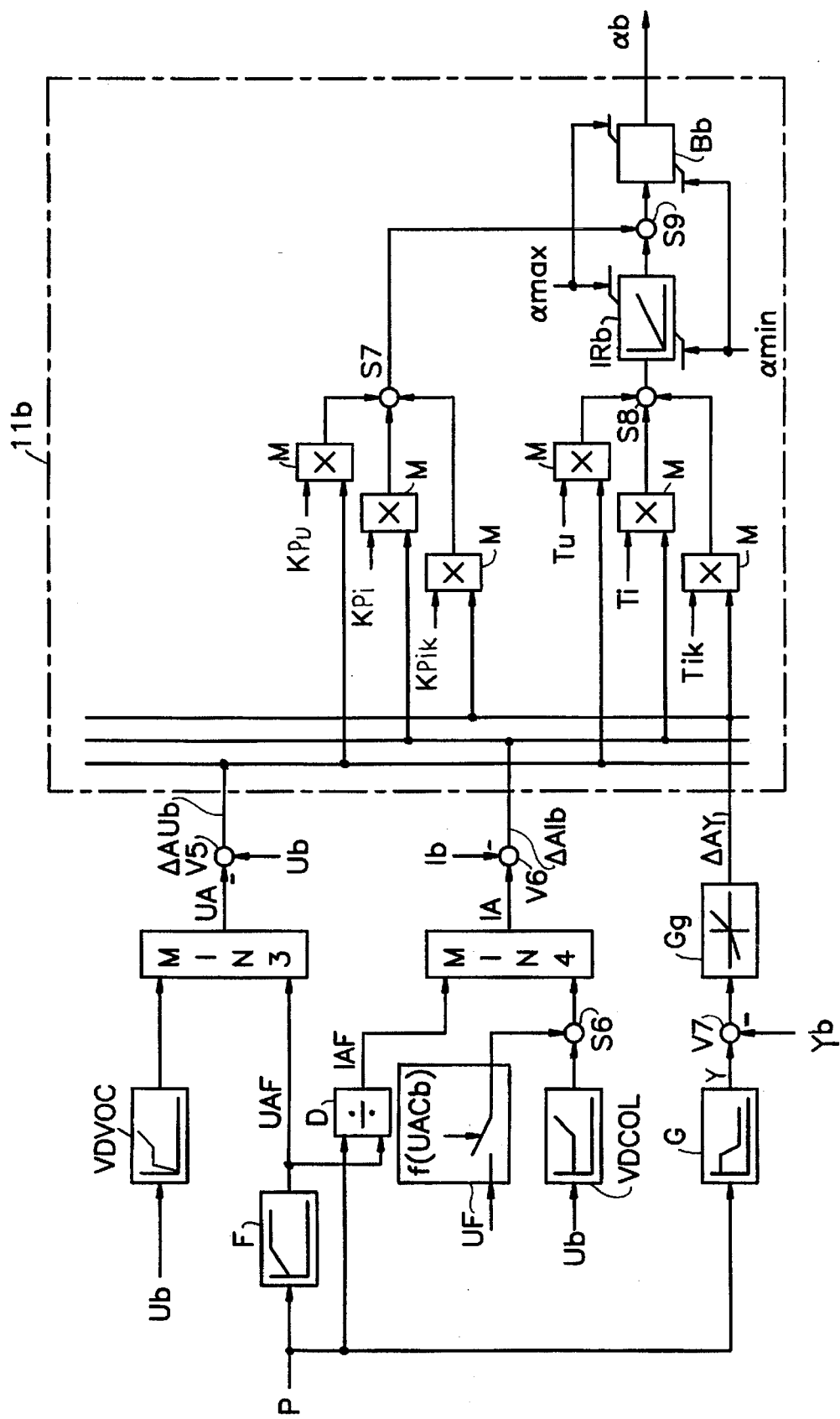
FIG. 3 shows a second controller structure which is intended for an inverter.

This results in the structure of a multi-dimensional controller. FIGS. 2 and 3 show illustrative embodiments of controller arrangements with closed-loop control devices 11a, 11b having a three-dimensional structure which is suitable for use in the arrangement 1a in FIG. 1. The figures are self-explanatory for the person skilled in the art. An expansion to control concepts of higher dimensions is possible.

FIG. 2 shows a configuration for the monopolar operation of the static converter 5a which is operating as rectifier. The closed-loop control device 11a is constructed as vector controller which is suitable for multi-dimensional closed-loop control. The entire closed-loop control branch of the rectifier exhibits an hierarchical structure.

Starting with the predetermined power P (nominal power), a fixed operating point voltage UAF and a fixed operating point current IAF are first generated with the aid of a function generator F and a divider D. The signal of a funcaiton generator VDVOC (Voltage Dependent Voltage Order Characteristic), together with fixed operating point voltage VAF is controlled via a minimum—demand selection MIN 1, which is followed by a comparator V1 for forming a voltage deviation ΔAUa. For this purpose the comparator is supplied with the voltage measurement value Ua. The function generator VDVOC preferably has a characteristic having a straight line through the origin. The characteristic is dependent on the intended strategy. However, other characteristics are also possible for other strategies.

The deviation between the power P and the measured power Pa which is determined from the current Ia and voltage Ua is determined by means of a comparator V9. A correction signal KP generated from this by a power controller L is supplied, together with the fixed operating point current IAF, to an adder S2 which precedes a second minimum-demand element MIN2. This is additionally supplied with a signal of a further function generator VDCOL (VOLTAGE DEPENDENT CURRENT ORDER LIMITATION) which, in the case of a fault, determines the amplitude of the operating point current IA. This value is compared with the actual current measurement value Ia in a further comparator V3 in order to obtain the deviation of the current ΔAIa.

Via a further branch, an intervention of an overcurrent controller Ü is possible which becomes active by means of a function element IF when the nominal current value IA exceeds a predeterminable value. A change signal ΔiK is then formed. The deviations ΔAUa, ΔAIa and ΔiK are the concrete example of a three-dimensional closed-loop control of the general representation in FIG. 1, with the deviations ΔAa1 to ΔAan.

All change signals ΔAUa, ΔAIa, ΔiK are then supplied to the closed-loop control device 11a, constructed as vector controller, which operates in accordance with the manner already described above. If necessary, it can also comprise an activation unit AE by means of which the vector controller can be enabled, disabled or stopped. The closed-loop control device 11a then supplies the desired control angle αa. As can be seen by the person skilled in the art, the closed-loop control device 11a is constructed internally in accordance with the equations listed above. The more detailed configuration can be seen in the description relating to FIG. 3.

Analogously to this, FIG. 3 shows the configuration of an inverter control branch. Additionally, an extinction angle controller branch with function generators G and Gg is also included. The nominal extinction angle value γ is determined with the function generator G from the power P to be transmitted. The system gain in the control loop for the extinction angle is varied by means of the function generator Gg. This branch is shown by way of an example of the monopolar operation of the static converter 5b, completely leaving the hierarchical structure. The shape of the VDCOL and VDVOC characteristics corresponds to those of the rectifier branch. The characteristics are adjusted in such a manner that they ensure a fast approach of the inverter to the operating point A and leave the control to the extinction angle controller branch in the vicinity of the operating point A—that is to say when the deviation vector ΔA quasi drops below a predeterminable value.

The deviations ΔAUb, ΔAIb and ΔAγ are in each case supplied to two groups having in each case three multipliers M which are in each case supplied with the associated constants KPu, KPi and KPix and, respectively, Tu, Ti and Tik. The output signals of the multipliers M of each group are added by means of adders S8 and S7, respectively. One addition signal is supplied to an I controller IRb, the output signal of which is added to the addition signal of the other adder S7 and is conducted via a limiter Bb. The control angle αb is then available for further processing at the output. The closed-loop control devices 11a and 11b of the rectifier 5a and of the inverter 5b only differ due to the activation device AE which can also be optionally provided in the inverter 5b.

Figure 5:
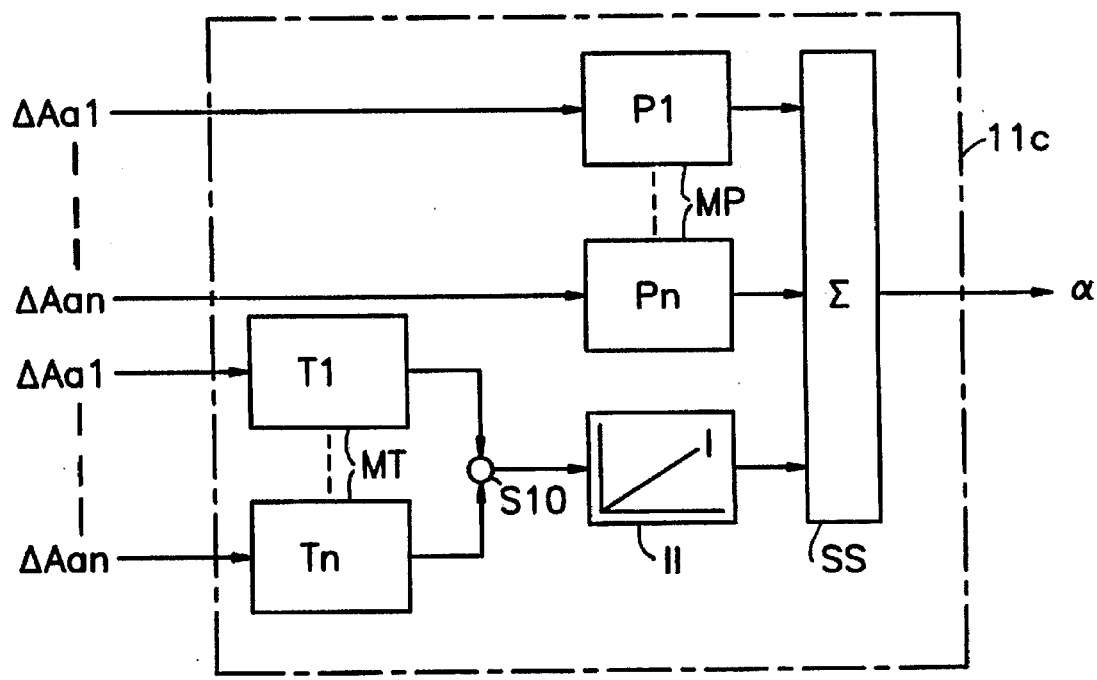
FIGS. 5 and 6 show examples of controllers.
Figure 6:
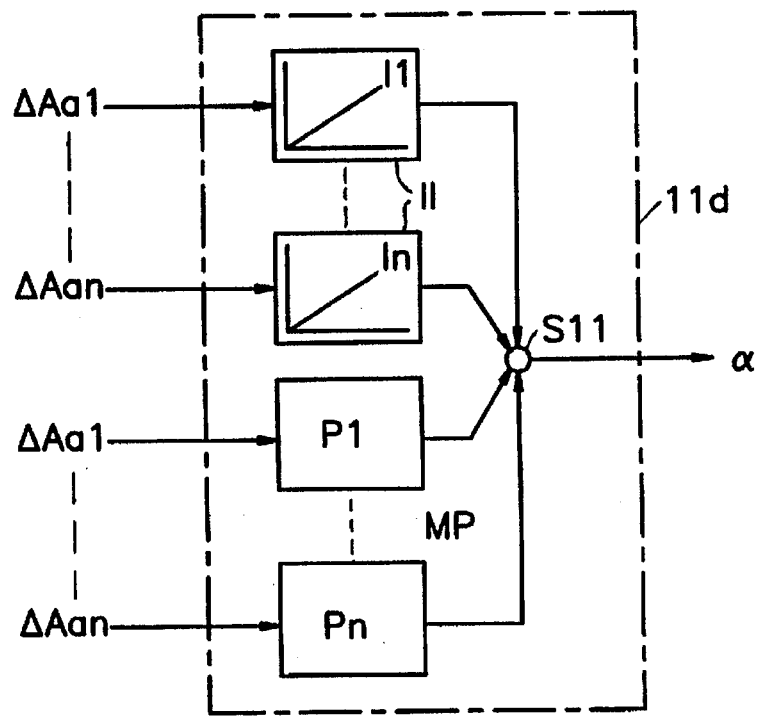

FIG. 5 shows a greatly simplified representation of the configuration of a closed-loop control device 11c which is used in principle in FIGS. 2 and 3. FIG. 6 shows an alternative embodiment which can also be used in certain cases.

In the closed-loop control device 11c according to FIG. 5, the deviations ΔAa1 to ΔAan are in each case supplied to associated multipliers MT and MP. The output signals of the multipliers MT are added and supplied to an I controller II, the output signal of which is added together with the output signals of the multipliers MP to form the control angle α in the adder SS.

In the closed-loop control device 11a according to FIG. 6, the deviations ΔAa1 to ΔAan are in each case supplied to associated multipliers MP and I controllers II. To form the control angle α, the output signals of all multipliers MP and I controllers II are added via an adder S11.

In summary, the control concept for the individual static converters can be described as follows:

a) at the rectifier 5a, there is an hierarchical controller structure; this comprises a power controller and a three-dimensional vector controller 11a for u, i and imax b) at the inverter 5b, there is a three-dimensional vector controller 11b for u, i and γ.

Naturally, the control method demonstrated and the associated devices can be modified or supplemented within the framework of expert considerations. In particular, it is conceivable to supplement the closed-loop control with the aid of fuzzy logic elements in accordance with weighted aspects. A neuron mode of operation is also conceivable which is executed in a self-learning manner.

What is claimed is:

1. A method for transmission of direct current between a plurality of converters in a high-voltage direct-current transmission installation, each of which is controlled by a different one of a plurality of control devices, comprising the steps of:

determining a common operating point from a predetermined power to be transmitted, said common operating point comprising a vector in multi-dimensional space;

determining a plurality of part-deviations between the dimensions of said common operating point and respective dimensions of the actual operating points of each of said plurality of converters;

deriving a plurality of part-control signals each from a different one of said plurality of part-deviations;

for each of said plurality of converters, combining each of said plurality of part-control signals associated with a particular converter in order to form a control signal and using said control signal to alter the operating point of the particular converter such that each of the part-deviations associated with the particular converter are simultaneously controlled to zero.

2. The method of claim 1 wherein the operating point of each of said plurality of converters approaches said common operating point simultaneously.

3. The method of claim 2 wherein each of said plurality of part-deviations corresponds to a dimension of said common operating point.

4. The method of claim 2 wherein the number of dimensions of said common operating point are predetermined.

5. The method of claim 1 wherein each of said plurality of part-deviations corresponds to a dimension of said common operating point.

6. The method of claim 5 wherein the number of dimensions of said common operating point are predetermined.

7. A closed loop control system for the transmission of direct current between alternating current systems, comprising, a plurality of static converters, each of which couples an alternating current system to a direct current line;

a plurality of closed-loop control devices, each of which determines a control angle from a plurality of part-deviations;

said plurality of part-deviations determined from a predetermined common operating point and an actual operating point of an associated one of said plurality of converters;

said common operating point being derived from the power to be transmitted and comprising a vector in multi-dimensional space;

a plurality of control devices, each of which couples an associated one of said plurality of closed-loop control devices to an associated one of said plurality of converters;

each of said plurality of control devices controlling the associated one of said plurality of converters in response to the control angle determined by the associated one of said plurality of closed-loop control devices such that said plurality of part-deviations are simultaneously controlled to zero.

8. The closed loop control system of claim 7 wherein at least one of said plurality of closed-loop control devices is a vector controller.

9. The closed loop control system of claim 8 wherein the number of dimensions of the vector controller is predetermined.

10. The closed loop control system of claim 9 wherein each of said plurality of closed-loop control devices comprise, a plurality of multipliers, each of which is supplied a different one of said plurality of part-deviations;

said plurality of part-deviations also being supplied to at least one current controller; and an adder which adds the output of said plurality of multipliers to the output of said at least one current controller in order to form the control angle.

11. The closed loop control system of claim 10, wherein each of said plurality of part-deviations is provided to a different one of a plurality of current controllers, the outputs of which are added to the outputs of said plurality of multipliers in order to form the control angle.

12. The closed loop control system of claim 8 wherein each of said plurality of closed-loop control devices comprise, a plurality of multipliers, each of which is supplied a different one of said plurality of part-deviations;

said plurality of part-deviations also being supplied to at least one current controller; and an adder which adds the output of said plurality of multipliers to the output of said at least one current controller in order to form the control angle.

13. The closed loop control system of claim 12, wherein each of said plurality of part-deviations is provided to a different one of a plurality of current controllers, the outputs of which are added to the outputs of said plurality of multipliers in order to form the control angle.

14. The closed loop control system of claim 13 wherein, before being supplied to said current controller, each of said plurality of part-deviations is supplied to a different one of a second plurality of multipliers, the sum of whose outputs are added and then supplied to said current controller.

15. The closed loop control system of claim 7 wherein each of said plurality of closed-loop control devices comprise, a plurality of multipliers, each of which is supplied a different one of said plurality of part-deviations;

said plurality of part-deviations also being supplied to at least one current controller; and an adder which adds the output of said plurality of multipliers to the output of said at least one current controller in order to form the control angle.

16. The closed loop control system of claim 15, wherein each of said plurality of part-deviations is provided to a different one of a plurality of current controllers, the outputs of which are added to the outputs of said plurality of multipliers in order to form the control angle.

17. The closed loop control system of claim 16 wherein, before being supplied to said current controller, each of said plurality of part-deviations is supplied to a different one of a second plurality of multipliers, the sum of whose outputs are added and then supplied to said current controller.

18. The closed loop control system of claim 7 further comprising:

a power element provided for each deviation, and an adder for output signal of each power element to an output signal of a current element controlled by the deviations.

* * * * *